June 14, 1932.    A. W. FREHSE    1,863,008
INTERNAL BRAKE
Filed Feb. 11, 1929
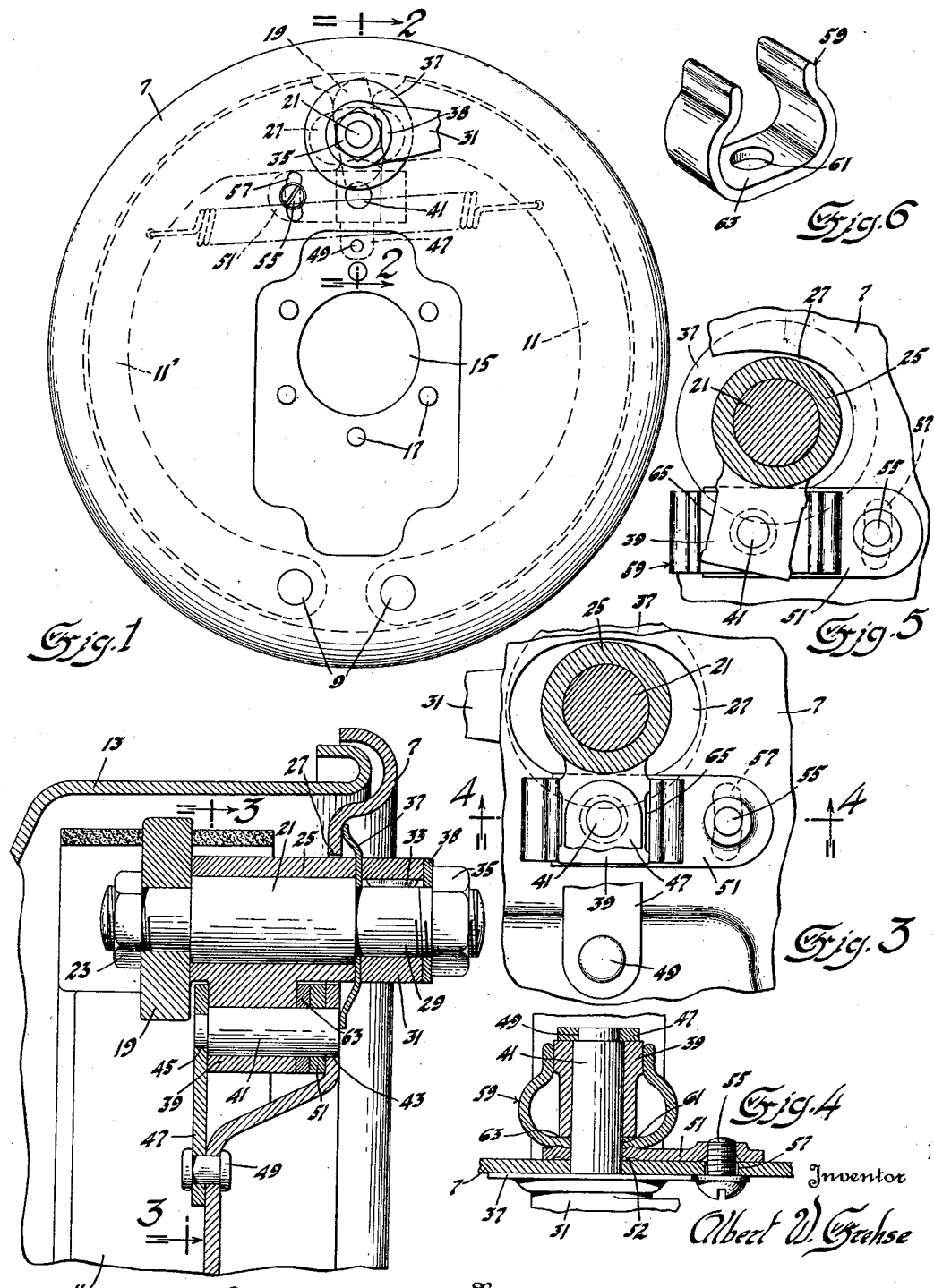

Patented June 14, 1932

1,863,008

UNITED STATES PATENT OFFICE

ALBERT W. FREHSE, OF DETROIT, MICHIGAN, ASSIGNOR TO GENERAL MOTORS CORPORATION, OF DETROIT, MICHIGAN, A CORPORATION OF DELAWARE

INTERNAL BRAKE

Application filed February 11, 1929. Serial No. 339,009.

This invention relates to brakes, and has been designed more particularly as an improvement for internal brakes as used on vehicles.

An object of the invention is to provide an improved mounting for the brake actuating means.

Another object is to provide a centralizing and adjusting mechanism for the brake actuating mechanism which shall be effective in operation and economical to manufacture.

Other objects and advantages will be understood from the following description.

The invention is illustrated in the accompanying drawing, in which

Figure 1 is a view in elevation facing the backing plate;

Figure 2 is a section on line 2—2 of Figure 1;

Figure 3 is a view from line 3—3 of Figure 2;

Figure 4 is a section on line 4—4 of Figure 3;

Figure 5 is a view similar to Figure 3 but showing the parts displaced;

Figure 6 is a perspective of a detail.

Referring by reference characters, numeral 7 represents the backing plate. This backing plate serves as usual to support anchor pins 9 for brake shoes 11 and 11'. These shoes are of arc shape and lie within and adjacent the inner surface of the brake drum 13, this brake drum to be mounted as usual on the vehicle wheel. The drawing shows a backing plate 7 for a front wheel. It has a central opening 15 to be received over the stub axle and openings 17 for the fastening means by which the drum is secured to the steering knuckle. Between the adjacent ends of the shoes is a cam 19 carried on the reduced end of a camshaft 21, the cam being secured by a nut 23. Rotation of the camshaft causes the rotation of the cam, which engages the adjacent ends of shoes 11 and 11' and expands the latter into frictional engagement with the drum, and thereby checks or stops the rotation of the drum and the wheel. The camshaft is not directly journalled in an opening in the backing plate. It is rotatable within a journal member 25. The camshaft extends through its rotatable support in journal 25 and also through a large opening in the fixed backing plate 7. On a reduced end 29 of shaft 21 is secured a lever arm 31 as by a key 33. A disc 37 may be positioned between the journal end 25 and the hub of lever arm 31. This disc is of sufficient dimensions to cover and protect the opening 27 in the backing plate, as shown in Figure 1. A nut 35 and washer 38 complete the assembly of the parts on the camshaft. Journal member 25 is extended as at 39 where it is pivoted on a pivot pin 41. Pivot pin 41 is supported in a suitable opening 43 in the backing plate 7, and at its other end is reduced and received within an opening 45 in a supporting plate 47, the latter secured as by the rivet 49 to the backing plate. It will be seen that the shoulder on the inner end of pivot pin 41 holds this pin for movement in one axial direction, and that the disc 37 engages the other end of the pin 41, and thereby holds the pin from axial movement in the opposite direction. It will also be understood that the camshaft with its journal 25 may swing about pin 41 to accommodate self-actuation of the brake shoes.

An adjusting arm 51 has a circular opening 52 through which the pin 41 passes. The arm 51 lies on the inner side of the backing plate, as shown in Figure 2. It extends laterally, as shown in Figure 3, where it may be secured to the backing plate by a suitable fastening means such as 55. This fastening means passes through the member 51 and also through a slot 57 in the backing plate, the slot being in the form of an arc struck from pivot pin 41 as a center. A somewhat U-shaped spring 59, as shown in Figure 6, is provided with an opening 61 in a bight portion 63, this opening dimensioned to fit pivot pin 41. The bight portion of the spring is secured, preferably by welding, to that portion of arm 51 which surrounds pin 41 so that the apertures 61 and 52 register. The sides of the U-shaped spring engage the sides of the extension 39. It will be noted from the drawing that the extension 39 is roughly rectangular in shape and that the opposite faces engage the opposed faces of the spring 59.

If desired, the engaging faces of the extension 39 may be relieved as at 65 so that the end portions only contact with the spring. Preferably the gap across the ends of the spring when in a position of rest is less than the transverse dimension of the journal extension 39 which is to be received between said ends. By this means there exists an initial tension in spring 59 when the extension 39 is assembled as in Figure 3.

Should the action of the brake be accompanied by a movement of the camshaft from the position shown by Figure 3 to that shown by Figure 5, one arm of the spring is bent beyond the position shown by Figure 3 by one end of one of the faces of extension 39, and the other arm of the spring is also additionally bent, but by the opposite end of the other face of said extension. This will be readily understood from an examination of Figure 5. This is the movement which occurs when the camshaft and cam follow up the movement of that shoe which is being rotated by the rotation of the drum, itself, in the same direction in which it is being rotated by the cam. The enlarged opening in the backing plate accommodates this self-actuating movement and is shaped to provide such accommodation for movements of the cam in either direction. When the vehicle is at rest, there is no movement of 39 about 41 when the brake is applied, the parts remaining as shown in Figure 3, the camshaft merely rotating in its journal. When the drum rotates clockwise, the drum carries shoe 11 clockwise about its pivot 9. The cam 19 is tending to turn the shoe 11 in the same direction. Shoe 11' is being rotated counterclockwise by the cam but clockwise by the drum. If the camshaft were journalled on a fixed axis on the backing plate, the resistance offered to its rotation by the clockwise rotation of shoe 11' would make it difficult to turn the cam sufficiently to exert much pressure upon shoe 11. By providing the floating mounting for the cam this difficulty is overcome, and the applied pressure may be divided equally between the two shoes. Shoe 11, under the influence of drum rotation and cam action, obviously frictionally engages the drum more effectively than shoe 11'. For a reverse direction, shoe 11' is more effective. The movement of the camshaft to accomplish these desirable results is accompanied by a tensioning of the arms of spring 59 somewhat above the initial tension given the spring by the assembly of part 39 between the arms. This additional tension affords the stored up energy for restoring and centralizing the camshaft after brake actuation, with the result that neither shoe may by any chance drag on the drum.

Should the shoe linings become unequally worn so that there is greater clearance between one shoe and the drum than is the case with the other shoe, a similar swinging movement of the cam carrier will take place when the brake is applied. This action may be excessive and an adjustment should be made to secure equal clearances between the shoes and the drum periphery. To make that correction, fastening means 55 is to be released and the brakes applied while the vehicle is at rest. Under these circumstances, if the clearance is unequal the cam carrier 39 will turn as before but without additionally bending the spring since, owing to the release of fastening means 55, the arm 51 together with the spring 59 will turn about center 41. With the brakes thus applied, and with fastening means 55 in a new position in its slot 57, the fastening means may then be secured, and upon release of the brake the clearance will be the same in the case of both shoes 11 and 11'. There has thus been provided a simple and effective centralizing arrangement associated with an equally simple adjusting arrangement readily operated by the fastening means 55 from a position outside the brake.

I claim:

1. In combination, a brake drum, frictional members to engage the drum, means to expand said members into contact with the drum, movably mounted means carrying said expanding means, a single spring having arms each normally under tension by engagement with said movable means, said spring arms being each additionally tensioned by said movable means when moved from its normal position.

2. In combination, a brake drum, friction means to engage the drum, operating means to effect said engagement, movable means carrying said operating means, said movable means having a normal position corresponding to the released position of said friction means, a single resilient element having arms each engaging and normally tensioned by said movable means, said movable means being mounted to additionally tension said spring arms when moved from its normal position incident to brake application.

3. In combination, a brake drum, shoes to engage the drum, expanding means to effect said engagement, carrier means rotatably supporting said expanding means, a pivot for said carrier, a single U-shaped spring having arms engaging opposite faces of said carrier, said spring being positioned such that both its arms are tensioned by movement of said carrier about its pivot.

4. In combination, a brake drum, shoes to engage the drum, expanding means to effect said engagement, a carrier rotatably supporting said expanding means, a pivot to permit said carrier to swing and carry said expanding means bodily while the latter is acting to expand said shoes, said carrier having opposed faces, a U-shaped spring having arms each engaging one of said faces on opposite sides of the carrier pivot whereby when said carrier turns on its pivot its opposed faces expand the said spring arms, and whereby the energy thereby stored in the spring functions to restore the carrier to centralized position.

5. The invention set forth in claim 4, said U-shaped spring being initially tensioned by assembly upon the carrier.

6. In combination, a brake drum, shoes to engage the drum, expanding means to effect said engagement, a carrier rotatably supporting said expanding means, a pivot to permit said carrier to swing and carry said expanding means bodily while the latter is acting to expand said shoes, said carrier having opposed faces, a U-shaped spring having arms engaging said faces whereby when said carrier turns on its pivot its opposed faces expand the said spring arms, and whereby the energy thereby stored in the spring functions to restore the carrier to centralized position, together with an adjusting plate rigidly supporting said spring, said plate being supported in part by the carrier pivot and other fastening means for adjustably securing said plate in angular positions about said pivot as a center.

7. In combination, cooperating brake means, actuating means for said brake, a movable carrier for said actuating means, a single centralizing spring for engaging said carrier, said spring having opposite flat faces, both of said faces being tensioned by the movement of the carrier from its position of centralization.

8. In combination, a brake drum, a pair of anchored shoes, cam means to expand said shoes, a carrier in which said cam means is journalled, means to permit said carried to swing and thereby afford bodily movement for said cam means, said carrier having opposite flat faces adjacent its pivot, a U-shaped spring having arms engaging said faces, whereby said spring arms are both tensioned by carrier rotation in either direction and whereby the spring tension serves to restore the carrier and cam to centralized position.

9. The invention set forth in claim 8, together with a plate rotatable about said carrier pivot, the spring being rigid with said plate and means to hold said plate in positions of angular adjustment about said pivot.

10. In a brake, a rotatable drum, a backing plate closing said drum, shoes anchored to said backing plate, a shaft extending through an enlarged opening in said backing plate and extending to a position between the adjacent ends of said shoes, cam means on said camshaft rotatable with said shaft to expand said shoes into contact with said drum, a carrier in which said camshaft is journalled, a supporting plate within said drum enclosure, a pivot carried by and between said supporting plate and backing plate, said carrier rotatable about said pivot, mechanism associated with said carrier and including a U-shaped spring having its opposite arms engaging said carrier for centralizing same.

11. In a brake, a rotatable drum, a backing plate closing said drum, shoes anchored to said backing plate, a camshaft extending through an enlarged opening in said backing plate and extending to a position between the adjacent ends of said shoes, cam means on said shaft and rotatable therewith to expand said shoes into contact with said drum, a carrier in which said camshaft is journalled, a supporting plate within said drum enclosure, a pivot carried by and between said supporting plate and backing plate, said carrier rotatable upon said pivot, a plate positioned in part by said pivot, means additional to said pivot to position and hold said plate in positions of adjustment about said pivot as a center, a U-shaped spring carried by said plate adjacent the said pivot, the arms of said spring engaging opposed faces on said carrier.

12. The invention set forth in claim 11, said spring having an initial tension, and both arms of which are additionally tensioned when the carrier rotates on its pivot.

In testimony whereof I affix my signature.

ALBERT W. FREHSE.